July 7, 1925.

R. STINSON 1,545,288

RUNNING GEAR FOR BABY CARRIAGES

Filed Sept. 14, 1922    2 Sheets-Sheet 1

Inventor:
Richard Stinson
By Attorney
Geo. H. Kennedy Jr.

July 7, 1925.

R. STINSON 1,545,288

RUNNING GEAR FOR BABY CARRIAGES

Filed Sept. 14, 1922     2 Sheets-Sheet 2

Inventor:
Richard Stinson
by Attorney
Geo. H. Kennedy Jr.

Patented July 7, 1925.

1,545,288

UNITED STATES PATENT OFFICE.

RICHARD STINSON, OF GARDNER, MASSACHUSETTS, ASSIGNOR TO HEYWOOD-WAKEFIELD COMPANY, OF BOSTON, MASSACHUSETTS, A CORPORATION OF MASSACHUSETTS.

RUNNING GEAR FOR BABY CARRIAGES.

Application filed September 14, 1922. Serial No. 588,184.

*To all whom it may concern:*

Be it known that I, RICHARD STINSON, a citizen of the United States, residing at Gardner, in the county of Worcester and Commonwealth of Massachusetts, have invented a new and useful Improvement in a Running Gear for Baby Carriages, of which the following, together with the accompanying drawings, is a specification.

The present invention relates to a running gear for baby carriages, with particular reference to a construction of same involving simplicity and ease of assemblage, together with the necessary rigidity of the parts. The several features of the invention which contribute to the foregoing and other advantages are fully set forth hereinafter, reference being had to the accompanying drawings, wherein—

Like reference characters refer to like parts in the different figures.

Figure 1:
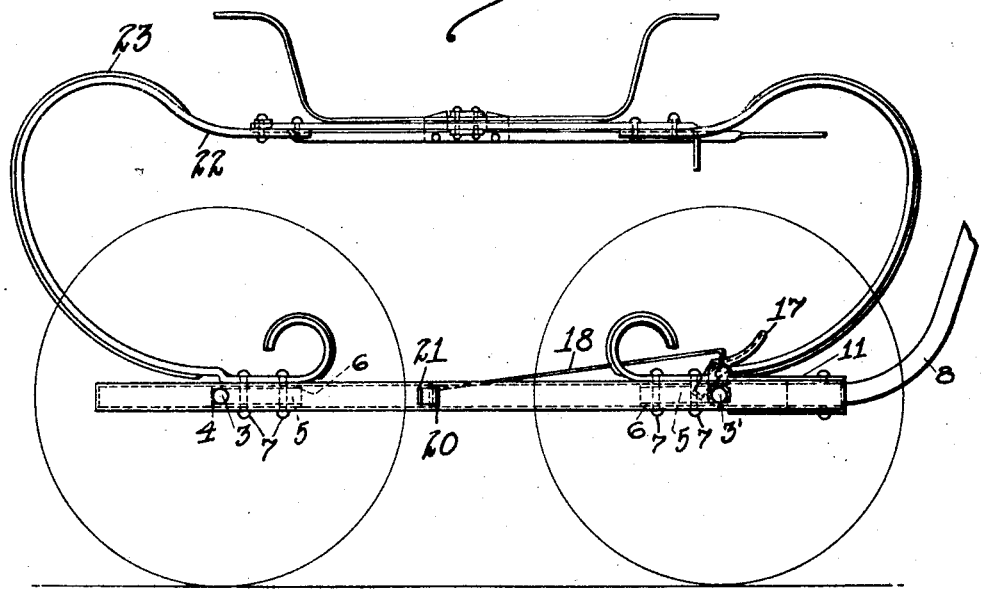
Fig. 1 is a view in side elevation of a baby carriage gear or frame constructed according to the invention.

As shown in the drawings, the frame which carries the wheel axles or spindles, and on which the springs are superposed, is of one-piece construction, comprising, preferably, an elongated member of channel section, which is bent substantially in U-form to provide longitudinal sides 1, 1 and a transverse connecting end 2. The open side of the channel section preferably faces inwardly, and thus the outer surface of the frame is constituted by the smooth unbroken bottom or web of the channel, as shown most clearly in Fig. 3.

Figure 3:
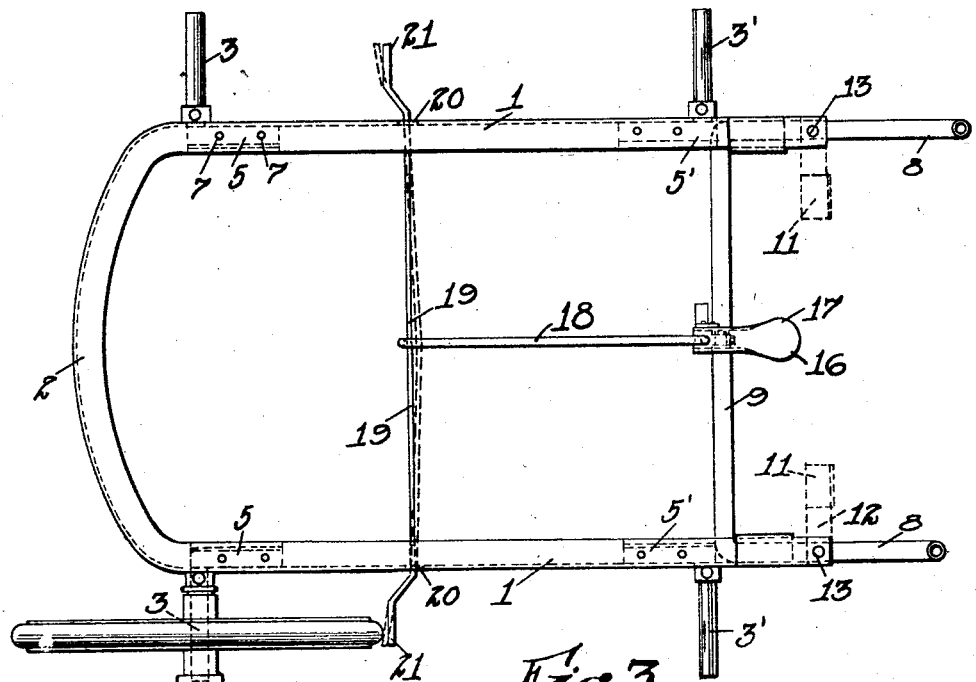
Fig. 3 is a plan view of the frame proper, with the springs removed.
Figures 4, 5:
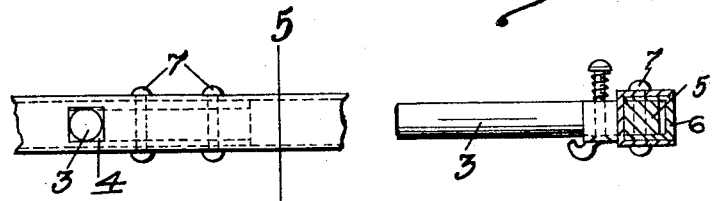
Fig. 4 is a fragmentary view in side elevation on a larger scale, showing the mode of attaching the wheel spindles to the frame.
Fig. 5 is a sectional view on the line 5—5 of Fig. 4.

This construction of the frame with an integral transverse portion 2 at the front, does away with the necessity for a separate front bracing member, or with the necessity for a front axle extending across and connecting the sides 1, 1 of the frame. Instead of the usual front axle, the construction provides separate short wheel spindles 3, 3 which project outwardly through holes 4, 4 provided in the outside or bottom portion of the channel section, as shown in Fig. 4, and said spindles 3, 3 at their inner ends are bent at right angles to provide attaching portions 5, 5 lying within and between the upper and lower sides or flanges of said channel section, as shown in Figs. 3, 4 and 5. The portions 5, 5 are preferably rectangular in section to conform to the section of the channel, and if necessary, the entire channel space adjacent the portions 5 may, for greater rigidity, be filled up by the use of spacing members 6, 6 which conveniently take the form of short channel sections receivable within the channel of the frame. A pair of bolts or rivets 7, 7 passing through each attaching portion 5 and through the associated spacing member, firmly and rigidly connect each spindle 3 to the frame.

Figure 2:
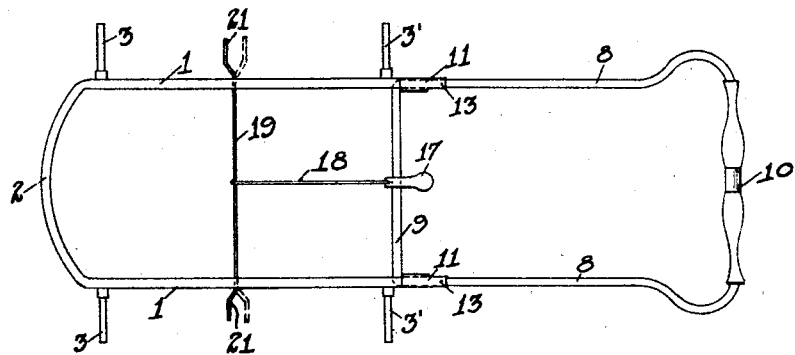
Fig. 2 is a top plan view thereof on a smaller scale, and showing in connection therewith a detachable handle bar construction.

Similar spindles 3', 3' are provided for the rear wheels of the vehicle, said spindles being attached to the sides 1, 1 of the frame in precisely the same manner as the front spindles 3, 3. This construction, in the absence of the usual rear axle or a transverse bracing member, is made possible by a special handle bar construction, which itself operates as a transverse brace for the frame between the rear ends of the sides 1, 1. As shown most clearly in Figs. 2 and 3, this handle bar construction consists of a one-piece, preferably tubular member bent in substantially U-form to provide sides 8, 8 and an integral forward connecting transverse portion 9; at their rear ends, the sides 8, 8 are connected by the usual bar 10, which affords a suitable grip for the hands of the operator. When this handle bar construction is secured in operative relation to the frame, as hereinafter described, the transverse portion 9 acts as a rigid rear brace for the sides 1, 1, and prevents any deflection of the free rear ends of said sides.

Figures 6, 7:
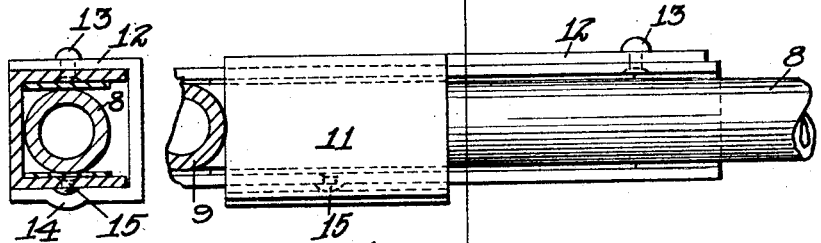
Fig. 6 is a large scale fragmentary view, showing the mode of securing the detachable handle bar construction to the frame.
Fig. 7 is a section on the line 7—7 of Fig. 6.

The forward end or bottom of the handle bar unit is adapted to be inserted and held, detachably, between the rear ends of the frame sides 1, 1,—the tubular material of the sides 8, 8, adjacent the end portion 9, being receivable between the upper and lower flanges of the channel section, as shown clearly in Figs. 3, 6 and 7. At its extreme rear end, each side 1, 1 of the frame provides a latch member 11 which, as shown in Figs. 6 and 7, is preferably made from material of channel section, of sufficient size to snugly embrace the channel section of the frame. In the formation of each latch member 11, the channel material for a portion of its length is cut away and removed except from the top side or flange, as shown at 12, 12; this portion 12, extending rearwardly from the complete channel portion of the latch, serves for the pivotal attachment of the latch to the top flange of the frame, by means of a rivet or stud 13. When the latches 11, 11 are swung inwardly, as shown in dotted lines, Fig. 3, their cutaway web and bottom flange portions permits the lower end of the handle bar unit to be inserted in place between the sides 1, 1 of the frame, as shown in Fig. 3; when this has been done, the two latches 11 are rocked on their pivots so as to assume the full line positions shown in Fig. 3, in which positions they are frictionally held by engagement of a depression 14 with a projection 15 on the bottom flange of the frame, as shown in Figs. 6 and 7.

The handle bar unit is readily removable from the frame, for the purpose of securing greater compactness in shipping or transporting the structure, by swinging both latches inwardly to permit endwise and sidewise withdrawal from the channels of sides 1, 1. However, when the parts are assembled together, and the latches 11, 11 frictionally locked in operative position, no relative endwise movement of the handle bar unit can take place, since the transverse frame bracing portion 9 bears on its front side against the adjacent attaching portions 5′, 5′ of the rear wheel spindles, and on its rear side against the forward edges of the latches 11, 11.

The frame bracing portion 9 of the handle bar unit carries a bracket 16, which provides pivotal support for a brake operating pedal 17 of the usual construction. The latter has a link or wire 18 extending forwardly and hooked around a transversely disposed bar 19 which passes loosely through alined slots 20, 20 formed in the web of the frame channel on opposite sides. The depression of pedal 17 causes a flexure of bar 19 into the position shown by dotted lines 19′, Fig. 3, whereby to throw both ends of said bar projecting beyond slots 20, 20 toward the front, for the exertion of a braking action on the periphery or tread of each front wheel. According to the invention, the bar 19 is so constructed that its wheel contacting portions 21, 21 are offset from the intermediate portion that is held in the slots 20, 20; in consequence of this, the bar 19 is prevented from becoming displaced when once in place, and is susceptible of operation as a braking device on two different sides of the wheels, without in any way changing the construction thereof. As shown in full lines in Fig. 2, when the bar 19 is inserted through slots 20 so that its portions 21 lie forwardly, it is adapted for the braking of wheels of one size, while when reversed, as shown in broken lines in Fig. 2, it is adapted for the braking of wheels of a larger size.

As shown in Fig. 1, the bolts or rivets 7, 7 which are used for holding the wheel spindles in place, can also be employed for securing the springs 22 that support the body of the vehicle, not shown. According to the invention, these springs 22 are formed with a longitudinal rib 23, whereby to increase the stiffness of the material and thus permit the use of lighter material than would otherwise be advisable.

I claim,

1. In a baby carriage or similar vehicle, a frame constituted by channel material, with the open end of said channel facing inwardly, in combination with individual wheel spindles projecting through the web of said channel and having integral portions at right angles to their axes and contained within the channel material of said frame and means for securing said integral portions to said channel material.

2. In a baby carriage or similar vehicle, a frame constituted by longitudinal inwardly opening side channels, springs supported by the upper flanges of said channels, individual wheel spindles projecting through the webs of said channels and having integral attaching portions at right angles within said channels, and common retaining devices securing said springs and said spindle attaching portions to said channels.

3. In a baby carriage or similar vehicle, a frame construction providing separate rear wheel spindles attached thereto, in combination with a handle bar unit providing a rear transverse brace for said frame, and latching means cooperating with said spindles to prevent endwise movement of said unit relative to said frame.

4. In a baby carriage or similar vehicle, an open frame of channel section, in combination with a detachable handle bar unit having a transverse portion adapted to close the open end of said frame and being receivable in the side channels of said frame, and latching means attached to said frame adapted to close the inserted portions of said handle bar unit in said channel section and by cooperation with said transverse portion to prevent withdrawal of said unit from said frame.

5. In a baby carriage or similar vehicle, an open frame of channel section in combination with a detachable handle bar unit having a transverse portion adapted to close the open end of said frame and being receivable in the side channels of said frame, latching means comprising a U-shaped member pivotally attached to said frame at the end of one side thereof adapted to close the inserted portion of said handle bar unit in said channel section, and a snap catch to hold said U-shaped member in the latched position.

RICHARD STINSON.